Patented Oct. 19, 1937

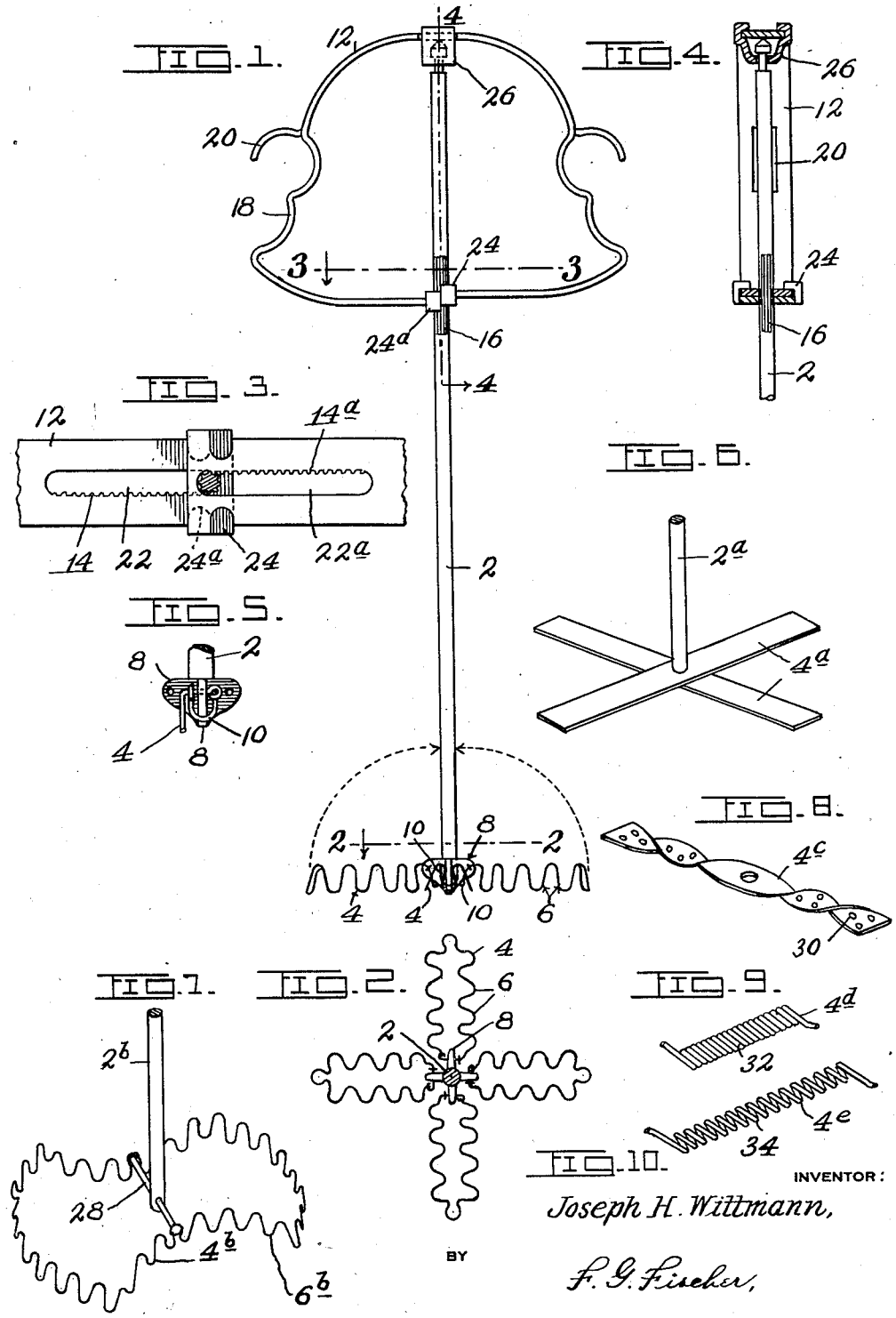

2,096,442

UNITED STATES PATENT OFFICE 2,096,442

MIXING DEVICE

Joseph H. Wittmann, Kansas City, Mo.

Application September 16, 1935, Serial No. 40,732

8 Claims. (Cl. 259—128)

My invention relates to a simple, inexpensive mixing device which may be made in different sizes and employed to advantage both domestically and commercially in the stirring, whipping, aerating, or mixing of various hot or cold articles such, for example, as different liquids, various kinds of soluble solids, or for mixing both liquids and solids together in a thorough and expeditious manner.

An important feature of the invention resides in an agitator which, in its preferred embodiment, comprises a suitable number of paddles flexibly connected to a drive shaft so that they may be folded umbrella-like against the latter and thus readily enter a container having too small a mouth to admit said agitator while in extended position. The flexible connections also permit the paddles to readily accommodate themselves to flat, concave, or other shaped bottoms of different kinds of containers into which the agitator may be introduced.

In practice, the paddles sweep the bottom of the container so that soluble solids being mixed with one or more solvent liquids will be readily dissolved instead of being allowed to accumulate upon the bottom as when the paddles operate some distance above said bottom. Furthermore, since the paddles operate upon the bottom they will not splash the mixture from the container even though the latter be in the form of a shallow dish, or pan.

In order that the invention may be fully understood, reference will now be had to the accompanying drawing, in which:

Fig. 1 represents a side elevation of one form of the mixing device.

Fig. 2 is a horizontal sectional view on line 2—2 of Fig. 1.

Fig. 3 is an enlarged broken horizontal section on line 3—3 of Fig. 1, with the agitator removed.

Fig. 4 is a broken vertical sectional view on line 4—4 of Fig. 1, with the drive shaft in elevation.

Fig. 5 is a fragmentary detail, partly in section, of the lower portion of the mixing device.

Fig. 6 is a broken detail showing a modified form of agitator.

Fig. 7 is a broken detail showing another modified form of agitator.

Fig. 8 is a detail of another modified form of agitator paddle.

Figs. 9 and 10 show still other forms of agitator paddles.

Referring more particularly to the form of mixing device shown by Figs. 1 to 5, inclusive, 2 designates a drive shaft provided at its lower end with an agitator comprising a plurality of flexible paddles 4. Each paddle comprises a narrow wire loop bent in zigzag formation to provide fingers 6 for rendering the paddle more efficient in its operation of mixing foods, beverages, chemicals and other compositions or ingredients.

The shaft 2 is provided at its lower portion with radially disposed lugs 8 having eyes through which the rear portions of the respective paddles 4 loosely extend so that said shaft 2 may operate at various angles with respect to the paddles 4. The loose connections also permit the paddles 4 to be folded upwardly umbrella-like against the shaft 2, as indicated by the arrows on Fig. 1, and each paddle has a stop 10 in the form of a depending loop adapted to contact the associated lug 8 and thereby check the downward movement of the paddle after the same has reached an approximately horizontal position.

The mixing device in its most simple form may consist only of the shaft 2 and one or more paddles 4 which may be operated by placing the shaft 2 between the palms of the hands and moving the latter back and forth in opposite directions to impart an alternating rotary motion to the shaft and the paddles.

It is apparent that different kinds of motors may be employed for driving the shaft 2. In Figs. 1, 3 and 4, I have shown a simple form of motor which may be operated with one hand and comprising a bow spring 12 provided at its lower ends with a pair of oppositely extending racks 14, 14a, engaging diametrically opposite portions of a pinion 16 on the shaft 2. The sides of the spring 12 have concave portions 18 to provide a convenient hand-grip, and lugs 20 for engaging over the forefinger and the thumb of the operator. By alternately compressing and relieving the bow spring 12 high speed alternating rotary motion may be transmitted to the agitator through the intermediary of the racks, 14, 14a, the pinion 16, and the shaft 2.

The racks 14, 14a form one of the longitudinal sides of respective slots 22 and 22a formed in the lower portions of the spring 12 as shown by Fig. 3, to accommodate the pinion 16 which projects through said slots. The lower portions of the bow spring 12, which are arranged to slide one upon the other, are held in operative relation to each other by lugs 24a, 24. The upper central portion of the bow spring 12 is provided with a bearing 26 in which the upper portion of the shaft 2 is journaled.

In the modified form shown by Fig. 6, 2a designates the drive shaft which is provided at its lower end with fixedly mounted paddles 4a arranged crosswise to each other and each consisting preferably of a flat piece of spring metal to permit the paddles to flex upwardly so that they may be inserted in a bottle or other container having too small an opening to admit the paddles while in extended position. Being of spring metal the paddles 4a may also readily accommodate themselves to various shaped bottoms found in different kinds of containers into which the paddles may be introduced.

In the modified form shown by Fig. 7, 4b designates the agitator, 28 a transverse member suitably connected at its ends to the agitator, and 2b the drive shaft which is freely mounted upon the central position of the transverse member 28 so that said drive shaft may assume various angular positions with respect to the agitator 4b when the device is either at rest or in operation. The agitator 4b comprises a strand of wire bent in zigzag form to provide a plurality of fingers 6b which add greatly to the efficiency of the device when in operation. The agitator 4b is preferably of elongated or elliptical form so that it may be readily inserted in a container having too small a mouth to admit a circular one whose diameter was equal to the length of the present agitator 4b.

Fig. 8 discloses a paddle 4c which is somewhat similar to one of the paddles 4a, excepting that it is twisted longitudinally and provided with perforations 30 to render it more effective in its mixing operation. In practice one or more of the paddles 4c are fixed to the lower end of the drive shaft, not shown.

In the modified forms shown by Figs. 9 and 10 the paddle 4d comprises a coiled wire with the coils 32 arranged in close formation, while the paddle 4e has the coils 34 in open formation so that when in operation the ingredients being mixed may pass between said coils.

So far as I am aware, I am the first to provide a mixing device having flexible paddles, or paddles flexibly connected to the drive shaft so that the latter may operate at various angles to the former, and also that the paddles may be folded against the drive shaft to enter a container having too small a mouth to admit them when in extended position, or may accommodate themselves to the irregular shaped bottoms present in some containers.

It is evident from the foregoing that I have provided an exceedingly simple and inexpensive device which, owing to its flexibility and the high speed at which it may be operated, has proven to be highly efficient and expeditious in whipping different ingredients into a blended compound.

While I have shown several different forms of my mixing device, I reserve all rights to such other forms and modifications thereof as properly fall within the spirit and scope of the invention as claimed.

Having thus described my invention, what I claim and desire to secure by Letters Patent, is:

1. A mixing device comprising a drive shaft, and an agitator comprising a plurality of equally-spaced loops loosely connected to said drive shaft and provided with a number of finger-like projections.

2. A mixing device comprising a drive shaft, lugs projecting from said drive shaft, and paddles connected to the lugs to swing in a vertical plane and provided with depending stops adapted to contact said lugs and thereby check the downward swing of the paddles when the same reach an approximately horizontal position.

3. A mixing device comprising a drive shaft, an agitator comprising a plurality of equally-spaced loops provided with a number of finger-like projections, said loops being flexibly connected to the drive shaft so that they may be folded against the latter or extended to working position, and means for operating the drive shaft.

4. A mixing device comprising a drive shaft, lugs projecting radially from said drive shaft, paddles swingable in a vertical plane and connected to the lugs so that said paddles and the drive shaft may operate at various angles to each other, stops integral with the paddles and adapted to contact said lugs and thereby check the downward swing of the paddles, and means for imparting an alternating rotary motion to the drive shaft.

5. A mixing device of the character described comprising a drive shaft, radially-disposed lugs fixed to the lower portion of said drive shaft and each having an eye, and paddles swingable in a vertical plane and each having its rear portion extending loosely through the eye of the respective lug and provided with a depending loop adapted to contact said lug and thereby limit the downward swing of the paddle.

6. A mixing device of the character described comprising a drive shaft, and a plurality of paddles extending radially from the drive shaft and swingably connected to the lower portion thereof so that they may be folded against said drive shaft, each paddle comprising a narrow loop having laterally extending finger-like projections.

7. A mixing device of the character described comprising a drive shaft, an agitator mounted upon the lower portion of said drive shaft, a pinion on the upper portion of the drive shaft, and a bow spring having slotted overlapping reciprocatory ends adapted to engage diametrically opposed portions of said pinion to drive the same.

8. A mixing device of the character described comprising a drive shaft, an agitator mounted upon the lower portion of said drive shaft, a pinion on the upper portion of the drive shaft, and a bow spring having slotted reciprocatory ends through which the shaft and said pinion extend, said ends having racks adapted to engage and impart an alternating rotary motion to the pinion.

JOSEPH H. WITTMANN.